US012558917B2

(12) United States Patent
Von Ravensberg et al.

(10) Patent No.: US 12,558,917 B2
(45) Date of Patent: Feb. 24, 2026

---

(54) WHEEL COVER FOR A MOTOR VEHICLE

(71) Applicant: DAIMLER TRUCK AG, Leinfelden-Echterdingen (DE)

(72) Inventors: Anna Von Ravensberg, Portland, OR (US); John Gerald Koch, Gresham, OR (US)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 449 days.

(21) Appl. No.: 18/015,694

(22) PCT Filed: Jul. 1, 2021

(86) PCT No.: PCT/EP2021/068135
§ 371 (c)(1),
(2) Date: Jan. 11, 2023

(87) PCT Pub. No.: WO2022/012942
PCT Pub. Date: Jan. 20, 2022

(65) Prior Publication Data

US 2023/0182504 A1      Jun. 15, 2023

(30) Foreign Application Priority Data

Jul. 14, 2020    (GB) ..................................... 2010790

(51) Int. Cl.
*B60B 7/06*          (2006.01)
*B60B 7/04*          (2006.01)
*B60B 7/20*          (2006.01)

(52) U.S. Cl.
CPC ............... *B60B 7/066* (2013.01); *B60B 7/04* (2013.01); *B60B 7/20* (2013.01);
(Continued)

(58) Field of Classification Search
CPC .............. B60B 7/04; B60B 7/066; B60B 7/20
See application file for complete search history.

(56) References Cited

U.S. PATENT DOCUMENTS

| 1,985,908 A | * | 1/1935 | Zerk | ......................... | B60B 7/14 |
| | | | | | 301/37.38 |
| 2,935,361 A | * | 5/1960 | Aske | ......................... | B60B 7/02 |
| | | | | | 301/37.38 |

(Continued)

FOREIGN PATENT DOCUMENTS

| DE | 198 26 060 A1 | 12/1999 | |
| FR | 2897302 A1 * | 8/2007 | ............... B60B 7/04 |

OTHER PUBLICATIONS

International Search Report and Written Opinion received for PCT Application No. PCT/EP2021/068135, mailed on Oct. 20, 2021, 09 pages.

*Primary Examiner* — Kip T Kotter
(74) *Attorney, Agent, or Firm* — ArentFox Schiff LLP

(57) ABSTRACT

The invention relates to a wheel cover (1) for a motor vehicle, comprising a first cover element (2), configured to be mounted to an axle assembly (3) of the motor vehicle, the first cover element (2) comprising a hole (2') through which a hub (3) of the axle assembly (3) is accessible. The wheel cover (1) comprises a second cover element (4), which is detachably connected to the first cover element (2) and covers the hole (2'), when connected to the first cover element (2).

11 Claims, 2 Drawing Sheets

(52) U.S. Cl.
CPC ................. *B60B 2900/1216* (2013.01); *B60B 2900/3318* (2013.01); *B60B 2900/521* (2013.01); *B60B 2900/531* (2013.01)

(56) References Cited

U.S. PATENT DOCUMENTS

| | | | | | |
|---|---|---|---|---|---|
| 4,235,476 | A | * | 11/1980 | Arvidsson ................. | B60B 7/04 301/37.26 |
| 5,358,313 | A | * | 10/1994 | Polka ..................... | B60B 7/008 301/108.4 |
| 5,829,843 | A | | 11/1998 | Eikhoff | |
| 9,199,508 | B2 | | 12/2015 | Kronemeyer et al. | |
| 2010/0270853 | A1 | | 10/2010 | Smith | |
| 2014/0265533 | A1 | | 9/2014 | Polka | |
| 2015/0210110 | A1 | * | 7/2015 | Rose ......................... | B60B 7/04 301/37.28 |
| 2018/0072094 | A1 | * | 3/2018 | Hsieh ................... | B60B 7/0013 |
| 2018/0272412 | A1 | * | 9/2018 | Bazerkanian ............ | B60B 7/14 |

* cited by examiner

WHEEL COVER FOR A MOTOR VEHICLE

CROSS-REFERENCE TO RELATED APPLICATIONS AND PRIORITY CLAIM

This non-provisional patent application is a 371 national phase of PCT application no. PCT/EP2021/068135, filed on Jul. 1, 2021, and titled "Wheel Cover for a Motor Vehicle," which claims priority to Great Britain patent application no. GB 2010790.0, filed on Jul. 14, 2020, and titled "Wheel Cover for a Motor Vehicle." The entire contents of these applications is incorporated herein by reference.

FIELD OF THE INVENTION

The invention relates to a wheel cover for a motor vehicle and to a motor vehicle with such a wheel cover.

BACKGROUND INFORMATION

Turbulences caused by rotating wheels of motor vehicles cause an aerodynamic drag, which reduces fuel economy for the vehicle. This problem can be addressed by covering the wheels with wheel covers. However, known wheel covers may not cover the wheel well sufficiently and therefore are not optimal in view of aerodynamic drag.

Furthermore, known wheel covers cover the axle hub. Therefore, in case of steering wheels of tractors, the axle oil level, which may be visible via the axle hub, cannot be checked before the trip. Thus, the wheel cover has to be removed, which is inconvenient and time consuming.

Document U.S. Pat. No. 9,199,508 B2 describes a wheel cover with a disc shape covering a concavity of a truck wheel rim. A retainer holds the wheel cover on the wheel rim. The retainer includes for example a ring which engages a channel in the outer lip of the wheel rim.

It is therefore an object of the present invention to provide an improved concept for a wheel cover for a motor vehicle, which further reduces aerodynamic drag and improves a comfort level for a user.

This object is achieved by the subject matter of the independent claim. Further implementations and preferred embodiments are subject matter of the dependent claims.

SUMMARY OF THE INVENTION

According to the improved concept, a wheel cover, in particular a non-rotating wheel cover, for a wheel of a motor vehicle, in particular a tractor or semi-truck, is provided. The wheel cover comprises a first, in particular rotationally symmetric, cover element, configured to be mounted to an axle assembly of the motor vehicle, wherein the first cover element comprises a hole through which a hub of the axle assembly is accessible, in particular when the wheel cover is mounted to the axle assembly. The wheel cover further comprises a second, in particular rotationally symmetric, cover element, which is detachably connected to the first cover element and covers the hole when the second cover element is connected to the first cover element.

A non-rotating wheel cover may be understood as a wheel cover which does not or not necessarily rotate together with the wheel when mounted to the motor vehicle. In particular, the non-rotating wheel cover may still be rotatable relative to the axle assembly, respectively. In other words, the non-rotating wheel cover may turn with the wheel together with the axle assembly during a normal operation of the motor vehicle since the wheel cover is mounted to the axle assembly.

The hub of the axle assembly is, in particular, accessible through the hole of the first cover element when the wheel cover is mounted to the axle assembly and when the second cover element is removed from the first cover element.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWINGS

The drawings show in.

In the figures the same elements or elements having the same function are indicated by the same reference signs.

DETAILED DESCRIPTION

Figure 1:
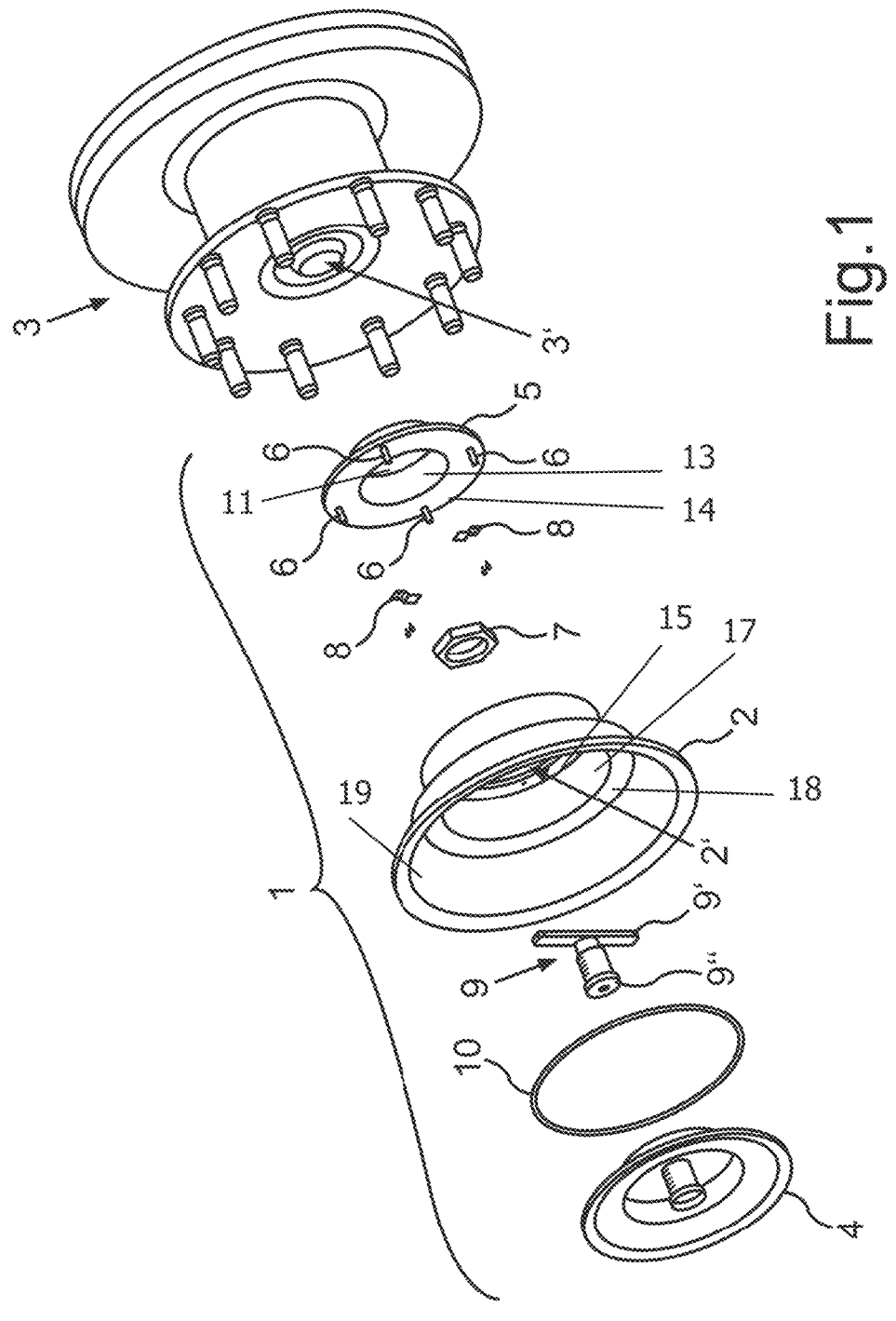
FIG. 1 an exploded view of an exemplary implementation of a wheel cover according to the improved concept.
Figure 2:
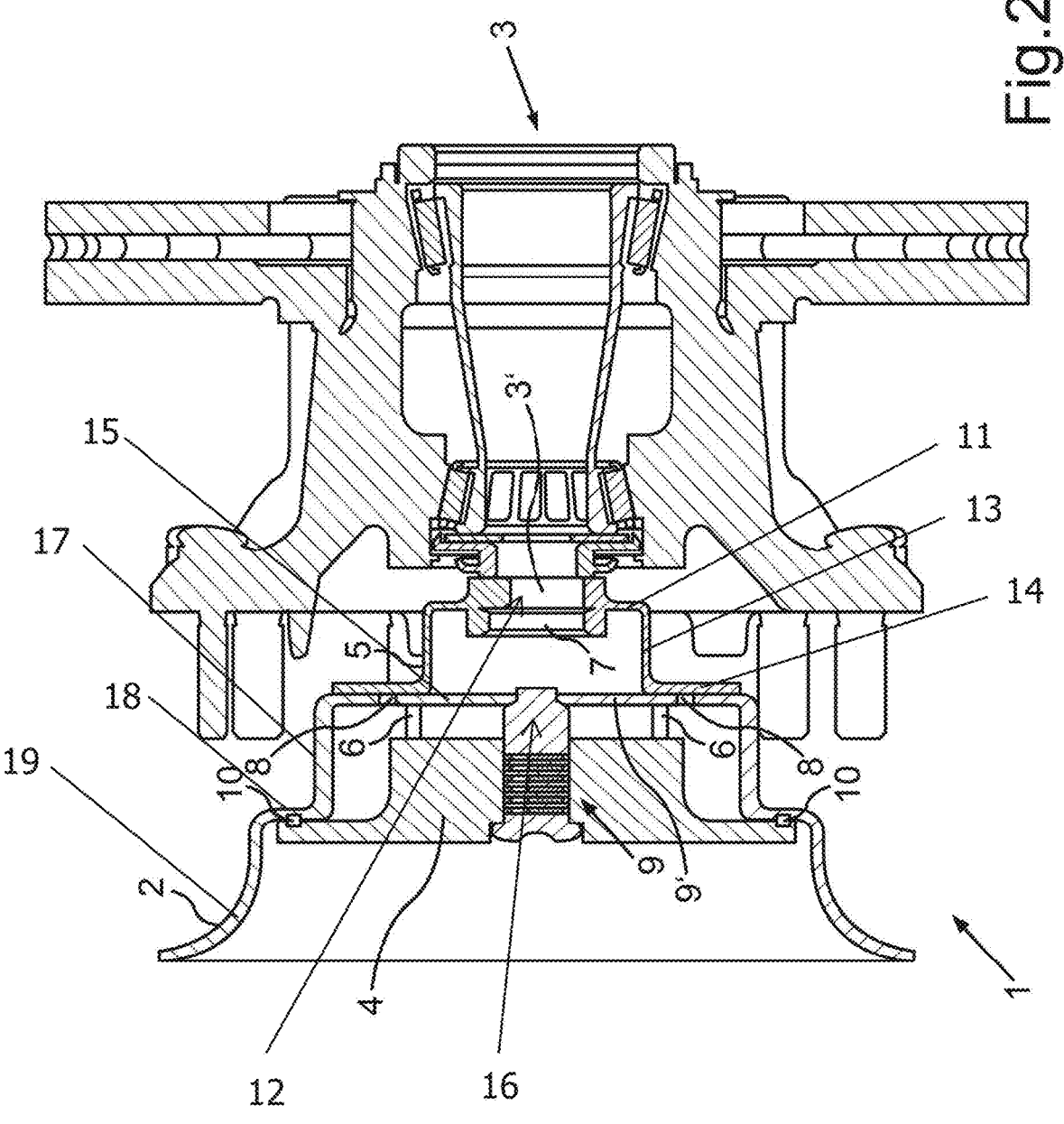
FIG. 2 a sectional view of a further exemplary implementation of the wheel cover according to the improved concept.

FIG. 1 shows an exploded view representation of a wheel cover 1 according to the improved concept as well as an axle assembly 3 of a tractor with an axle hub 3'. The wheel cover 1 comprises a cover mounting hub 5, including a mounting hub base portion 11, further including an internal wall that defines a first opening 12, a mounting hub body portion 13 and a mounting hub flange portion 14, for mounting the wheel cover 1 to the axle assembly 3. In some implementations, the wheel cover 1 may also comprise an assembly lock nut 7 to mount the cover mounting hub 5 to the axle assembly 3. FIG. 2 shows a corresponding sectional view The wheel cover 1 comprises a first cover element 2, including a first cover element base portion 15, further including an internal wall that defines a second opening 16, a first cover element body portion 17, a first cover element flange portion 18 and a first cover element flange portion extension 19 which is mounted to the cover mounting hub 5, by one or more studs 6, for example by four studs on the cover mounting hub 5. The studs 6 may be threaded to secure the first cover element 2 in place with nuts. In alternative embodiments, the studs may be non-threaded and may align with closed tolerance holes on the first cover element 1. The wheel cover 1 further comprises a second cover element 4, which can be inserted in the first cover element 2 to cover a hole 2' of the first cover element 2, through which the axle hub 3' is accessible when the wheel cover 1 is mounted to the axle assembly 3. The second cover element 4 is detachably connected to the first cover element 2. The second cover element 4 may be radially surrounded by the first cover element 2 when connected to the first cover element 2

In an embodiment, the first cover element 2 is for example held in place with the second cover element 4 and remains stable during dynamic events such as air turbulence or driving over rough terrain or pot holes.

In an embodiment, the wheel cover 1 comprises a lock assembly 9 to lock the connection of the second cover element 4 and the first cover element 2. In some embodiments, the lock assembly 9 comprises a lock lever 9' designed to engage with one more lock tabs 8, which are attached to the cover mounting hub 5, to lock the connection of the second cover element 4 to the first cover element 2. The cover mounting hub 5 may for example comprise holes to allow for the lock tabs 8 to be secured to the cover mounting hub 5. The lock assembly 9 may also comprise a key lock 9", which may be operable with an ignition key that is also usable to operate an ignition lock or a cabin door lock of the motor vehicle. The second cover element 4 together with the lock assembly 9 precludes the removal of the first cover element 2 without first removing the second cover element 4. The second cover element 4 may for example be spring loaded in order to take up any tolerances in the system.

A hub of the axle assembly 3 may be accessible through the hole 2' of the first cover element 2 when the wheel cover 1 is mounted to the axle assembly 3 via the mounting hub 5, and when the second cover element 4 is removed from the first cover element 2. In this way, a user may inspect the axle oil level without dismounting the full wheel cover 1.

Furthermore, in some embodiments, the wheel cover 1 may comprise a cover seal 10, which may for example be designed as a seal ring, which is arranged between the first cover element 2 and the second cover element 4.

As described with respect to the figures, the improved concept provides a non-rotating wheel cover, which may increase fuel economy, convenience for the user during pre-trip inspection of steering wheel axle oil level, and increased security from wheel cover theft. The improved concept also covers a motor vehicle, in particular a tractor, with an axle assembly 3 and a wheel cover 1 according to the improved concept mounted to the axle assembly 3.

Aerodynamic studies have shown that by a non-rotating wheel cover according to the improved concept as described above, aerodynamic drag can be further reduced. The wheel cover according to the improved concept can fill the wheel well without ground interference issues. The wheel cover may also rotate around the set access of the steering link in order to travel with the tire. Furthermore, the wheel cover according to the improved concept allows the user to remove the second cover element to easily check the axle oil side glass.

Furthermore, the removal of the second cover element can for example be completed by inserting and rotating the same key that is used to unlock the cab door and to start the ignition. Therefore, there is no separate tool required.

Moreover, the complete wheel cover cannot be removed from the vehicle without removing the second cover element. In scenarios in which the second cover element can only be removed by using a key, the risk for the wheel cover being stolen is reduced.

REFERENCE SIGNS 1 wheel cover
2 first cover element
2' hole
3 axle assembly
3' axle hub
4 second cover element
5 cover mounting hub
6 studs
7 assembly lock nut
8 lock tabs
9 locking assembly 9' locking lever
9" key lock
10 cover seal

The invention claimed is:

1. A wheel cover for a motor vehicle, comprising:
a mounting hub including:
a mounting hub base portion, extending perpendicular to an axle axis defined by an axle of the motor vehicle, and affixed to an axle assembly, wherein the mounting hub base portion includes an internal wall that defines a first opening;
a mounting hub body portion extending from the mounting hub base portion, wherein the mounting hub body portion extends parallel to the axle axis; and
a mounting hub flange portion extending from the mounting hub body portion, wherein the mounting hub flange portion extends perpendicular to the axle axis;
a first cover element configured to be mounted to the axle assembly of the motor vehicle via the mounting hub, including:
a first cover element base portion, extending perpendicular to the axle axis, and affixed to the mounting hub flange portion, wherein the first cover element base portion includes an internal wall that defines a second opening;
a first cover element body portion extending from the first cover element base portion, wherein the first cover element body portion extends parallel to the axle axis; and
a first cover element flange portion extending from the first cover element body portion, wherein the first cover element flange portion extends perpendicular to the axle axis; and
a second cover element detachably connected to the first cover element flange portion and which covers the first opening and the second opening when connected to the first cover element.

2. The wheel cover according to claim 1, wherein the second cover element is radially completely surrounded by the first cover element when the second cover element is connected to the first cover element.

3. The wheel cover according to claim 1, wherein the mounting hub comprises at least two studs to secure the first cover element to the mounting hub.

4. The wheel cover according to claim 1, wherein the wheel cover further comprises an assembly lock nut to mount the mounting hub to the axle assembly.

5. The wheel cover according to claim 1, wherein the wheel cover further comprises:
one or more lock tabs secured to the mounting hub; and
a lock assembly comprising a lock lever designed to engage with the one or more lock tabs to lock the second cover element to the first cover element.

6. The wheel cover according to claim 5, wherein the lock assembly is movable between a locked state and an unlocked state using a key.

7. The wheel cover according to claim 6, wherein the key is an ignition key or a door key of the motor vehicle.

8. The wheel cover according to claim 1, wherein the wheel cover further comprises a lock assembly to lock the second cover element and the first cover element.

9. The wheel cover according to claim 1, further comprising a seal ring arranged between the first cover element and the second cover element.

10. The wheel cover according to claim 1, wherein the axle assembly is accessible through the first opening and the second opening when the second cover element is detached from the first cover element.

11. The wheel cover according to claim 1, wherein the first cover element flange portion further comprises a first cover element flange portion extension that extends from the first cover element flange portion beyond the second cover element at an angle relative to the axle axis.

\* \* \* \* \*